Patented Sept. 22, 1953

2,653,152

UNITED STATES PATENT OFFICE 2,653,152

CYANINE DYE AND PROCESS OF MAKING SAME

John H. Dessauer, Pittsford, and Michael A. Insalaco, Rochester, N. Y., assignors to The Haloid Company, Rochester, N. Y., a corporation of New York No Drawing. Application August 4, 1950, Serial No. 177,778

7 Claims. (Cl. 260—240.4)

This invention relates to photographic sensitizing dyes and their method of preparation, and in particular to a new process for the manufacture of asymmetric photosensitizing dyes.

This is a continuation-in-part of application Serial No. 753,380, filed June 7, 1947, now abandoned, which in turn was a division of application, Serial No. 610,460, filed August 13, 1945, now abandoned.

It has previously been known that certain dyes are valuable sensitizing materials for silver halide photographic products, and dyes of this type have been prepared and incorporated in photographic products. However, many dyes which are of value, and particularly many asymmetric dyes which are of increased value, are either difficult or impossible to prepare by known methods. Now, in accordance with the present invention, a new chemical process has been devised for the preparation of asymmetric dyes of this type and particularly suited for the preparation of new asymmetric dyes. According to this invention, a nitrogen-substituted rhodanine compound in an inert organic solvent is reacted, in the presence of an organic base, with a quaternary salt of a 2-methyl thiazoline compound which serves the dual purpose of supplying one of the major groups for the dye and also supplying a reaction product which serves as a linking group in the reaction. More specifically, a 2-methylthiazoline quaternary salt of the general formula:

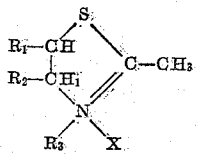

wherein $R_1$ and $R_2$ are members of the group consisting of hydrogen and lower alkyl, $R_3$ is lower alkyl, and X is an acid radical, is reacted with a N-substituted rhodanine in which the substituent group on the nitrogen atom is a lower alkyl or lower aryl group, the reaction being carried out in an inert organic solvent and in the presence of organic base.

The members which make up the class designated by $R_1$ and $R_2$ in the formula are such as hydrogen, methyl, ethyl, allyl, and the like, and the members which make up the class designated by $R_3$ are such as methyl, ethyl, propyl, allyl, and other lower alkyl radicals. The groups which make up the class designated by X are acid radicals which, together with $R_3$, may be introduced by reacting the appropriate thiazoline base with an alkyl acid compound such as alkyl halides including methyl iodide, methyl bromide, ethyl iodide and the like, and other acid compounds such as methyl p-toluene sulfonate, ethyl p-toluene sulfonate, and the like. The two major ingredients, namely, the N-substituted rhodanine compound and the 2-methylthiazoline quaternary salt, are reacted together in the presence of an organic base and a suitable inert organic solvent for the various ingredients including as the organic base such basic compounds as saturated heterocyclic amines including piperidine, and aliphatic amines including methylamine, ethylamine, propylamine, dimethylamine, diethylamine, methylethylamine, methylisopropylamine, trimethylamine, triethylamine, dimethylpropylamine, and the like. Suitable solvents are those inert organic liquids which are effective solvents for these ingredients and include such materials as acetone and ethyl acetate, the lower alcohols including methyl, ethyl and propyl alcohols, chloroform, carbon tetrachloride, and the like.

The product which results from the action together of these ingredients may be represented by the formula:

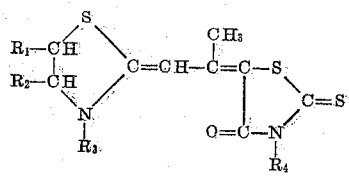

wherein $R_1$, $R_2$ and $R_3$ are as indicated before, and $R_4$ is a lower alkyl or lower aryl group. It is to be observed that the substituent group designated by X in the formula for the quaternary salt has been separated in the reaction and is not represented by an equivalent group in the final product. It is also to be observed that the linking group:

which joins together the rhodanine radical and the thiazoline radical is not represented by a third reacting constituent in the reaction formula but, instead, is formed as an intermediate reaction product of the methylthiazoline quaternary salt under the conditions of the reaction, and that accordingly the methylthiazoline salt serves the dual purpose of providing the linking agent for the reaction and also forming one of the major substituent groups of the final product.

Example I

A mixture of 24 grams of 2-methylthiazoline ethiodide, 8 grams of nitrogen-methyl rhodanine, 80 millilitres of anhydrous ethyl alcohol, and 15 grams of triethylamine was refluxed for one and one-half hours. After cooling and filtering, the solution resulted in 7.5 grams of a red dye. The dye was washed successively with alcohol, water, alcohol and ether, and recrystallized from a mixture of chloroform and methanol. The final yield was 2.5 grams of dye with a melting point of 171° C.

Example II

A mixture of 24 grams of 2-methylthiazoline methiodide, 8 grams of nitrogen-methyl rhodanine, 80 millilitres of anhydrous alcohol and 15 grams of triethylamine was refluxed for three hours.

After cooling and filtering, 4 grams of a brownish-red dye resulted. This was recrystallized to give a dye with a melting point of 216° C. which when dissolved in alcohol produced a red solution.

Example III

A mixture of 24 grams of 2-methylthiazoline methiodide, 10.5 grams of nitrogen-phenyl rhodanine, 80 millilitres of anhydrous alcohol and 15 grams of triethylamine was refluxed for three hours. This resulted in 1.1 grams of a red dye with a melting point of 237° C. after cooling and filtering as previously described.

Example IV

A mixture of 13 grams of 2-methylthiazoline ethiodide, 6 grams of nitrogen-phenyl rhodanine, 100 millilitres of anhydrous alcohol and 8 grams of triethylamine was refluxed for one and one-half hours, and yielded 1.7 grams of bright red dye with a melting point of 245° C.

Example V

A mixture of 11 grams of 2-methylthiazoline and 20 grams of beta-iodopropionic acid was heated at 130° C. for forty-five minutes. After cooling, a yellow solid was obtained and this was dissolved in 80 millilitres of anhydrous alcohol, after which 16 grams of nitrogen-ethyl rhodanine and 30 grams of triethylamine were added, and the mixture refluxed for two hours. After cooling, a mixture of glacial acetic acid and water was added, resulting in red crystals with a yield of 4 grams and a melting point of 211° C.

Example VI

A mixture of 24.3 grams of 2-methylthiazoline methiodide, 8 grams of nitrogen-ethyl rhodanine, 80 millilitres of anhydrous ethyl alcohol and 15 grams of triethylamine was refluxed for three hours. Reaction took place quickly and resulted in a deep red solution which was cooled and filtered, giving 4.5 grams of a red-orange dye with a melting point of 230° C. The dye was recrystallized from chloroform and methanol to produce a pure product with a melting point of 232° C.

The same dye can also be obtained by using 2-methylthiazoline methyl para-toluene sulfonate in place of the methiodide.

Example VII

A mixture of 9.6 grams of 2-methyl thiazoline and 18 grams of ethyl para-toluene sulfonate was heated for two and one-half hours at 120–130° C. The reaction mixture was cooled and 50 millilitres of anhydrous ethyl alcohol was added to dissolve the quaternary salt. To this solution, there was then added 4.8 grams of nitrogen-ethyl rhodanine and 12.6 grams of triethylamine. A red color formed immediately on the addition of the triethylamine and the mixture was refluxed for three hours. On cooling and subsequent filtration, 6 grams of crude red dye were obtained.

Example VIII

A mixture of 24 grams of 2-methylthiazoline methiodide, 16 grams allyl rhodanine, 120 millilitres of anhydrous alcohol and 15 grams of triethylamine was refluxed for two hours. This produced 3 grams of a crude red dye, and by recrystallization from a mixture of chloroform and alcohol, there were obtained 2.2 grams of a bright red dye having a melting point of 159° C.

Example IX

The experiment of Example VIII was repeated, substituting 30 grams of 2-methyl thiazoline ethyl para-toluene sulfonate in place of the 2-methyl thiazoline methiodide. This resulted in a yield of 1.5 grams of a red dye with a green-blue reflex, with a melting point of 146° C.

Example X

A mixture of 51.4 grams of 2-ethyl thiazoline methiodide, 32 grams of nitrogen-ethyl rhodanine, 100 millilitres of anhydrous ethyl alcohol, and 30 grams of triethylamine was refluxed for three hours. Water was then added in sufficient quantity to separate the dye in the form of a dark oil. The oil was then washed by decantation successively with mixtures of alcohol and water, and ethyl ether and petroleum ether. The oil was dissolved in small amounts of chloroform for each washing and the dye finally crystallized out from a mixture of chloroform and ethyl ether. The dye was recrystallized twice from chloroform and ethyl ether and obtained as crystals with a green cast, in a yield of 8 grams, with a melting point of 134–135° C.

Example XI

A mixture was prepared of 63 parts of 2,5-dimethylthiazoline ethyl p-toluene sulfonate, 16 parts of N-ethyl rhodanine, 125 parts (by volume) of anhydrous ethyl alcohol and 31.5 parts of triethylamine. This mixture was heated at reflux for three hours after which it was cooled and water was added in an amount just sufficient to cause a slight turbidity. The turbid mixture was further cooled whereupon 10 parts by weight of crystalline material separated out. The crystals were a crude dye which was purified by recrystallizing twice with a mixture of chloroform and methanol, yielding 5.5 parts of ox blood, raspberry-red crystals of melting point 135° C.

Example XII

A mixture was prepared of 11 parts of 2-methylthiazoline and 20 parts of β-iodide propionic acid and the mixture heated at 130° C. for 45 minutes to form a yellow solid. 80 parts by volume of anhydrous ethyl alcohol, 10 parts of N-ethyl rhodanine, and 30 parts of triethylamine were then added to this yellow product and the resultant solution was refluxed for 3 hours. The solution was cooled and there was added to it a mixture of 20 parts by volume of acetic acid and 60 parts by volume of water, and after further cooling crystals of a crude dye separated. This dye was boiled out with a mixture of chloroform and ethyl alcohol to yield a purified dye with a melting point of 216° C. The product is an orthochromatic sensitizer soluble in alkaline aqueous solutions.

What is claimed is:

1. The process of preparing asymmetrical dyes of the formula:

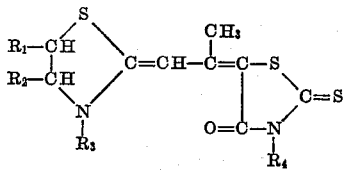

consisting of reacting in an anhydrous inert organic solvent and in the presence of an organic base, an N-substituted rhodanine of the formula:

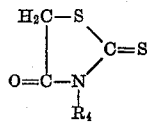

with two molecular portions of a compound serving the dual role of forming a major constituent of the product and also yielding a product of reaction to form the linking agent for the two major groups, said reacting compound having the general formula:

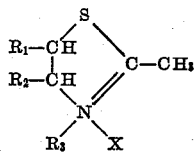

$R_1$ in each formula being selected from the group consisting of hydrogen and lower alkyl, $R_2$ in each formula being selected from the group consisting of hydrogen and lower alkyl, $R_3$ in each formula being lower alkyl, $R_4$ in each formula being selected from the group consisting of lower alkyl and lower aryl, and X being an acid radical.

2. The process of claim 1, wherein the N-substituted rhodanine is N-ethyl rhodanine and the quaternary salt is the ethyl p-toluene sulfonate of 2-methyl thiazoline.

3. In the process for preparing asymmetric dyes of the formula:

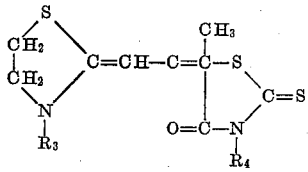

wherein $R_3$ and $R_4$ are the same or different members selected from the group consisting of lower alkyl, the step consisting of reacting together in an anhydrous inert solvent and in the presence of an organic base, one molecular proportion of an N-substituted lower alkyl rhodanine and about two molecular proportions of a lower alkyl quaternary salt of 2-methyl thiazoline serving the dual role of forming a major group of the asymmetric dye and also yielding a product of reaction to form the linking agent for the two major groups.

4. The process of claim 1, wherein the N-substituted rhodanine is N-ethyl rhodanine and the quaternary salt is the ethyl iodide of 2-methyl thiazoline.

5. The process of claim 1, wherein the N-substituted rhodanine is N-ethyl rhodanine and the quaternary salt is the ethyl p-toluene sulfonate of 2,5 dimethyl thiazoline.

6. The process of claim 1, wherein the N-substituted rhodanine is N-allyl rhodanine and the quaternary salt is the ethyl p-toluene sulfonate of 2-methyl thiazoline.

7. The process of claim 1, wherein the N-substituted rhodanine is N-allyl rhodanine and the quaternary salt is ethyl p-toluene sulfonate of 2,5 dimethyl thiazoline.

JOHN H. DESSAUER.
MICHAEL A. INSALACO.

References Cited in the file of this patent

UNITED STATES PATENTS

| Number | Name | Date |
| --- | --- | --- |
| 2,058,406 | Brooker | Dec. 27, 1936 |
| 2,185,182 | Brooker | Jan. 2, 1940 |
| 2,265,908 | Kendall | Dec. 4, 1941 |
| 2,430,295 | Kendall | Nov. 4, 1947 |